United States Patent [19]

Horl

[11] Patent Number: 4,977,597
[45] Date of Patent: Dec. 11, 1990

[54] STEREO RECEIVER CIRCUIT

[75] Inventor: Manfred L. A. Horl, Hamburg, Fed. Rep. of Germany

[73] Assignee: U.S. Philips Corp., New York, N.Y.

[21] Appl. No.: 381,618

[22] Filed: Jul. 18, 1989

[30] Foreign Application Priority Data

Jul. 22, 1988 [DE] Fed. Rep. of Germany ....... 3824890

[51] Int. Cl.$^5$ .............................................. H04H 5/00
[52] U.S. Cl. ......................................... 381/11; 381/13
[58] Field of Search ...................... 381/10, 11, 2, 3, 4, 381/13; 331/20, 125

[56] References Cited

U.S. PATENT DOCUMENTS 3,790,714  2/1974  Ohsawa .................................. 381/11
4,718,113  1/1988  Rother et al. ....................... 455/302
4,769,841  9/1988  Cugnini ............................... 381/106

Primary Examiner—Forester W. Isen
Attorney, Agent, or Firm—Emmanuel J. Lobato

[57] ABSTRACT

Stereo receiver circuit for processing a multiplex signal comprising a pilot signal by means of a pilot signal detector which detects frequency components in the multiplex signal at the frequency of the pilot signal and which controls a Schmitt trigger for influencing the mono/stereo operation, said circuit also comprising a control circuit capturing the noise components in the multiplex signal and acting on the Schmitt trigger. To prevent the Schmitt trigger from switching between the state for mono operation and the state for stereo operation in the case of weak reception field strengths, the control circuit is only active in mono operation and influences the input signal of the Schmitt trigger in the case of reception of sufficiently strong noise components to such an extent that the Schmitt trigger remains in its switching state for mono operation.

3 Claims, 1 Drawing Sheet

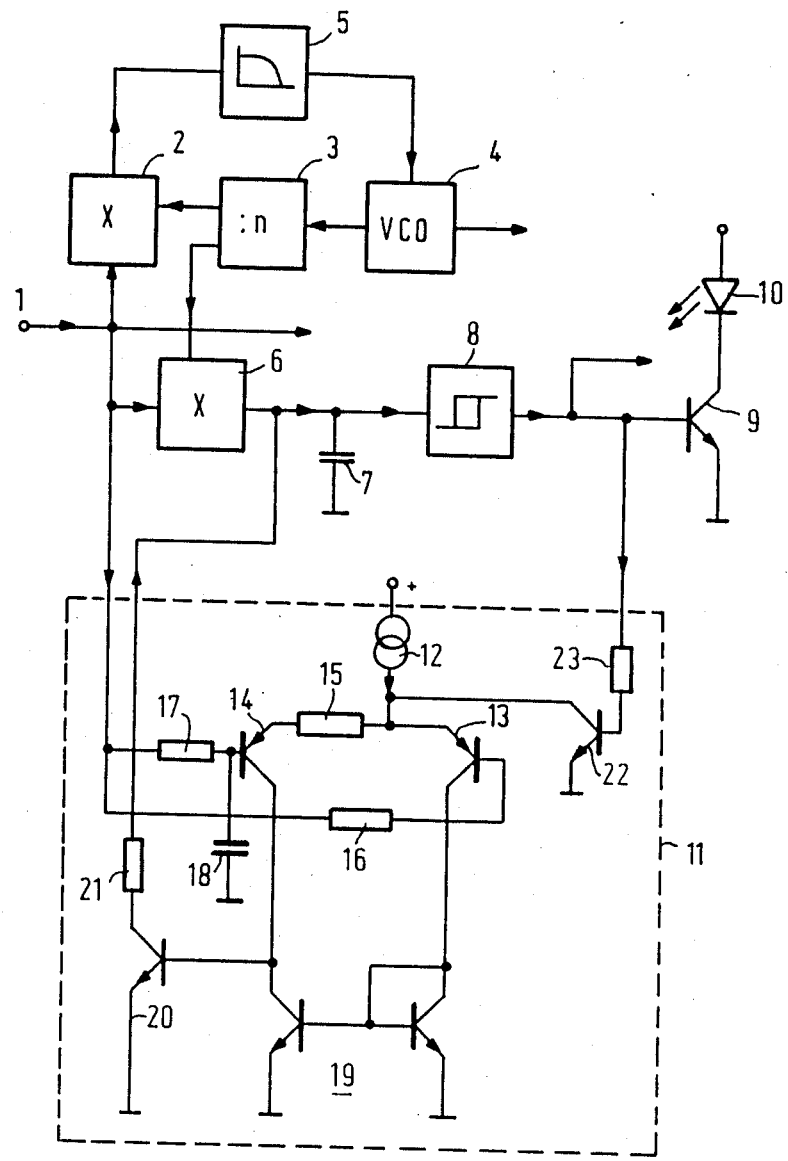

STEREO RECEIVER CIRCUIT

BACKGROUND OF THE INVENTION

The invention relates to a stereo receiver circuit for progressing a multiplex signal comprising a pilot signal by means of a pilot signal detector which detects frequency components in the multiplex signal at the frequency of the pilot signal and which controls a Schmitt trigger for influencing the mono/stereo operation, said circuit also comprising a control circuit capturing the noise components in the multiplex signal and acting on the Schmitt trigger.

Such a circuit, which is essentially known from DE-AS No. 27 53 199 may be used in an FM stereo radio receiver but also in a television receiver which can receive stereophonic audio signals, for example, in accordance with the U.S. standard.

At small reception field strengths the output signal of the pilot signal detector is subject to fluctuations due to the noise which is superimposed on the multiplex signal, which fluctuations may lead to a constant switching between mono and stereo operation and to flickering of a stereo indicator coupled to the output of the Schmitt trigger. To avoid these disturbing effects, a control circuit is arranged in the known stereo receiver, which circuit captures the noise components in the multiplex signal and which controls the threshold value and the hysteresis of the Schmitt trigger accordingly. A Schmitt trigger is herein understood to mean a switching amplifier with hysteresis, i.e. a circuit which may assume two switching states, dependent on the input signal, the transition from one state to the other being effected at a different level of the input signal than the transition in the opposite direction. In the known circuit the pilot signal detector comprises a bandpass filter tuned to the frequency of the pilot signal and succeeding a rectifier. The voltage at the rectifier output fluctuates to a proportionally small extent at small field strengths so that the constant switching of the Schmitt trigger can be substantially suppressed by causing the switching threshold and the hysteresis to follow.

In a pilot signal detector in which the output signal fluctuates to a consirderably stronger extent than in the known pilot signal detector, the known circuit principle cannot be used. For example, pilot signal detectors cooperating with a PLL circuit can supply output signals which may be both clearly above and clearly below the output level which is obtained in the case of undisturbed stereo reception.

It is an object of the invention to provide a circuit of the type desribed in the opening paragraph in which switching of the Schmitt trigger is substantially prevented, even at a strongly fluctuating output signal of the pilot signal detector.

SUMMARY OF THE INVENTION

According of the invention this object is solved in that the control circuit is only active in mono operation and influences the input signal of the Schmitt trigger in the case of reception of sufficiently strong noise components to such an extent that said Schmitt trigger remains in its switching state for mono operation.

According to the invention the control circuit is only active in mono operation. In the case of strong mono transmitter signals the noise components in the multiplex signal are so weak that the control circuit cannot influence the input signal of the Schmitt trigger. In the case of a decreasing level of the received mono transmitter signals the noise components will be stronger—also those in the frequency range of the pilot signal—but the control circuit then influences the input signal of the Schmitt trigger in such a way that it remains in its mono operating state. When receiving a strong stereo transmitter signal the control circuit is inoperative and the output level of the pilot signal detector is sufficiently large to switch the Schmitt trigger to the stereo operating state. If the level of this transmitter decreases, the fluctuations of the output signal of the pilot detector increase in response to the noise until they come below a minimum value and the Schmitt trigger reaches the mono-operating state. This switching state activates the control circuit and the noise components, which are then sufficiently strong, cause the control circuit to maintain the Schmitt trigger in its mono-operating switching state.

BRIEF DESCRIPTION OF THE DRAWING

The invention will now be described in greater detail with reference to the accompanying drawing showing the block-schematic diagram of a part of the stereo decoder of a stereo receiver.

DETAILED DESCRIPTION OF THE INVENTION

A multiplex signal in the case of stereo operation and an audio signal in the case of mono operation, possibly accompanied by noise components, are present at an input terminal 1 which is arranged in a signal path in which the input terminal is preceded by an RF input circuit, an IF stage and an FM demodulator (all these components not shown). This signal is applied to various stages of the stereo decoder.

The signal at the input 1 is compared with a signal originated from a voltage-controlled oscillator 4 in a phase comparison circuit 2, which supplies an output signal which is proportional to the product of its input signals. The oscillator 4 oscillates at the n-fold value of the pilot signal frequency, preferably at its four-fold value; therefore the output signal is applied to a further input of the phase comparison circuit 2 via a frequency divider 3 which divides the frequency of this signal by the factor n. The compensation signal of the phase comparator is applied to the voltage-controlled oscillator 4 via a low-pass filter 5. If the signal at the input 1 comprises a pilot signal, the PLL circuit (2 . . . 5) thus formed will lock in at the frequency of the pilot signal, with a phase shift of 90° existing between the output signal of the frequency divider 3, which signal is active at the input of the phase comparator 2, and the pilot signal.

Moreover, the signal at the input 1 is applied to an input of a multiplier stage 6 in which it is multiplied with an output signal of the frequency divider 3 which is 90° shifted in phase with respect to the signal at the other output of the frequency divider 3. The multiplier circuit 6 supplies a voltage at its high-ohmic output, which voltage is proportional to the product of the input signals. This voltage thus comprises a component at twice the frequency of the pilot signal, as well as a DC component. The DC component charges a capacitor 7 connected to the output of the multiplier circuit 6, which capacitor 7 constitutes a pilot signal detector together with the multiplier circuit 6 and suppresses components of the double pilot signal frequency.

Thus, a direct voltage which is applied to a Schmitt trigger 8 is obtained at the capacitor 7. This trigger is constructed in such a way that it changes from a switching state for mono operation to a switching state for stereo operation when a pilot signal with a sufficient level is present. In its stereo operation the Schmitt trigger 8 turns on, i.e. switches into a conducting state a switching transistor 9 which controls an optical indicator, for example, in the form of a light-emitting diode 10 and which also controls over a mono/stereo switch which is not further shown, resulting in stereo reception when receiving a sufficiently strong stereo transmitter signal.

The circuit 1 . . . 10 described so far is known (compare, for example, the integrated circuit TDA 1578A of Valvo/Phillips). When weak mono transmitter signals are received, the PLL decoder 2 . . . 5 may lock in at frequency components of the noise in the input signal, which components fall within the lock-in range of the PLL circuit. The pilot signal detector 6, 7 may then relatively often supply an output signal which suffices to bring the Schmitt trigger 8 to its stereo switching state for a short time. Likewise, when a weak stereo transmitter is received, the ocsillator may lock in at frequency components which are present in the noise, which components deviate from the frequency of the pilot signal. The resultant phase variations lead to considerable fluctuations of the output voltage of the pilot detector 6, 7 so that the Schmitt trigger relatively often changes over to the mono switching state for a short time. The consequent continual variation of the indicator (light-emitting diode 10) and of the reception state (mono reception or stereo reception) is very disturbing to the user. It is substantially prevented by a control circuit 11.

In the case of a weak reception field strength this circuit ensures that the voltage at the pilot detector is decreased and that the Schmitt trigger is switched to or remains switched in the state for mono operation. It is controlled by the output signal of the Schmitt trigger 8 in such a way that it only becomes active when the Schmitt trigger 8 is in its state for mono operation and it evaluates the noise above the useful frequency range in the signal at the terminal 1.

The circuit comprises a DC source 12 whose direct current is directly applied to the emitter of a transistor 13 and to the emitter of a transistor 14 via a resistor 15. The bases of transistors 13 and 14 are connected to the input 1 via equal resistors 16 and 17, a capacitor 18 connected to the base of the transistor 14 constituting, together with the resistor 17, a low-pass filter which has a time constant of about 400 ns. The collector of a transistor 13 is connected to the input and the collector of the transistor 14 is connected to the output of a current mirror 19. The output of the current mirror is also connected to a transistor switch 20 which, in series with a limiter resistor 21, is arranged parallel to the capacitor 7. The terminal of the DC source 12 at the differential amplifier 13 . . . 15 is connected to the collector-emitter path of a switching transistor 22 whose base is connected to the output of the Schmitt trigger 8 via a limiter resistor 23.

If the Schmitt trigger 8 is in its switching state for mono operation, its output voltage, likewise as its input voltage is low, so that the transistor 22 is turned off and the current of the DC source 12 only flows via the transistors 13 and 14. However, if the Schmitt trigger is in its switching state for stereo operation, its output voltage is so large that the switching transistor 22 is turned on and the entire current of the DC source 12 is shunted to earth via this transistor. In this switching state for stereo operation the circuit 11 is inactive.

In the case of mono operation the base of transistor 14 receives the low frequencies, i.e. the entire useful frequency range of the multiplex signal. These frequencies naturally also appear at the base of transistor 13; but components of higher frequencies originating from the noise above the useful frequency range are additionally obtained. As long as the reception circumstances are satisfactory, the noise components are small and the bases of the transistors 13 and 14 essentially receive the same signal. Due to the DC voltage drop at the resistor 15 the base-emitter voltage of the transistor 14 is smaller than that of the transistor 13 and consequently the collector current of the transistor 13 is larger than that of the transistor 14. As a result, the current at the output of the current mirror 19 is larger than the collector current of the transistor 14 and the transistor switch 20 connected to the output of the current mirror 19 is blocked.

Relatively large noise signals in the range above the useful frequency are obtained in the case of weak transmitted. If the amplitudes of these noise components of the frequency f exceed a threshold value U, for which the relation holds that $$U = 0.5IR(1+(f_g/f)^2)^{\frac{1}{2}}$$

in which I is the direct current supplied by the source 12, R is the value of resistor 15 and $f_g$ is the 3 dB cut-off frequency of the low-pass filter 17, 18, the current supplied by transistor 14 may become larger than the current of the transistor 13 for a short time. In fact, the noise components at the base of transistor 13 are then larger than the DC voltage drop at resistor 15 so that the positive noise voltage peaks can render the base-emitter voltage of the transistor 13 smaller than the base-emitter voltage of the transistor 14 for a short time. During these peaks the collector current of the transistor 14 is larger than the output current of the current mirror 19 and the switching transistor 20 is switched in its conducting mode, i.e. it is turned on. With respect to transistor 20 the circuit 12 . . . 19 thus operates as a high-pass filter succeeded by a rectifier.

If the transistor 20 is turned on, the capacitor 7 is discharged via the series arrangement of the limiter resistor 21 and the transistor 20, the discharge current being essentially larger than the current which the multiplier stage 6 can supply for charging the capacitor.

The control circuit 11 cooperates with the stages 6 to 8 of the stereo decoder in the following manner:

In the case of strong mono signals the signal at the input 1 comprises at most very small components in the frequency range of the pilot signal. Consequently, the voltage at the capacitor 7 is only small and the Schmitt trigger 8 is in its switching state for mono operation so that the switching transistor 22 is turned off, or in other words blocked. The circuit 11 is then active, but the noise having a higher frequency is so weak that the collector current of the transistor 13 is always larger than that of the transistor 14. The transistor switch 20 is thus blocked and the voltage at the capacitor 7 only depends on the input signals of the multiplier stage 6.

If the reception field strength of a transmitter transmitting mono signals becomes weaker, the noise components will become larger, both in the frequency range of the pilot signal and above the useful frequency range.

The increase of noise components in the frequency range of the pilot signal results in a fluctuation of the signal supplied by the multiplier stage 6, which fluctuation may become so large that the voltage at capacitor 7 could switch over the Schmitt trigger 8 for a short time if there were no control circuit 11. However, since the peaks of the noise components having a higher frequency turn on the switch 20 in this state of reception, the capacitor 7 is discharged so that such a switch-over is prevented.

When receiving a strong stereo transmitter, the mutliplex signal at the input 1 continually comprises a relatively strong pilot signal component at which the PLL circuit 2 . . . 5 locks in so that the capacitor 7 is charged to a voltage which exceeds the threshold value of the Schmitt trigger 8 so that this Schmitt trigger changes over to the switching state for stereo operation. As a result, the transistor 22 is turned on and the circuit 11 becomes inactive. When receiving stereo transmitters having a small field strength, the pilot signal amplitude decreases and the noise increases. The output signal of the multiplier stage 6 than fluctuates to a considerable extent and may become so small for a short period that the Schmitt trigger 8 switches over. As a result, the transistor 22 is turned off and the control circuit 11 becomes active. The noise components having a higher frequency then ensure that the transistor 20 is turned on so that the capacitor 7 is discharged to such an extent that the Schmitt trigger constantly remains in its switching state for mono operation at this field strength or at field strengths which are still small. If the reception field strength subsequently increases again—and the noise components accordingly decrease again—to such an extent that the transistor 20 is substantially no longer turned on, the capacitor 7 may be charged to a value at which the Schmitt trigger swtiches over to stereo. However, this field strength is larger than that at which it necessarily changes over from stereo operation to mono operation. The circuit 11 therefore also has a hysteresis effect.

The pilot signal detector may be replaced by another circuit which is responsive to components in the input signal at the frequency of the pilot signal and which generates an output signal which is dependent on their amplitude. It is only essential that the control circuit influences this output signal or the input signal of the Schmitt trigger in such a way that the Schmitt trigger remains in the state for mono operation in the case of strong noise.

I claim:

1. A stereo receiver circuit for processing a multiplex signal comprising a pilot signal by means of a pilot signal detector (6, 7) which detects frequency components in the multiplex signal at the frequency of the pilot signal and which controls a Schmitt trigger (8) for influencing the mono-stereo operation, said circuit also comprising a control circuit (11) capturing the noise components in the multiplex signal and acting on the Schmitt trigger, characterized in that the control circuit (11) is only active in the mono operation and influences the input signal of the Schmitt trigger (8) in the case of reception of sufficiently strong noise components to such an extent that said Schmitt trigger remains in its switching state for mono operation;

the control circuit (11) comprising a high-pass filter circuit which substantially suppresses the useful frequencies in the multiplex signal;

the high-pass filter circuit is constituted by a differential amplifier (12 . . . 15), one input of which receives the multiplex signal in an unfiltered form and the other input of which receives the multiplex signal via a low-pass filter (17, 18); and the differential amplifier comprises two transistors (13, 14) whose bases receive the output signal of the low-pass filter (17, 18) and the unfiltered multiplex signal and whose emitter current is supplied by a current source (12) which is connected via a resistor (15) to the emitter of the transistor (14) connencted to the low-pass filter (17, 18) and is directly connected to the emitter of the other transistor (13).

2. A circuit as claimed in claim 1, characterized in that the colletors of the transistors (13, 14) are connected to the input and the output, respectively, of a current mirror (19) whose output is also coupled to a transistor switch (20) whose output is arranged in parallel with a capacitor (7) at which the output signal of the pilot signal detector is present.

3. A circuit as claimed in claim 1, characterized in that a current source (12) supplies a direct current to the different amplifier (13 . . . 15), which direct current can be shunted via a transistor switch (22) controlled by the Schmitt trigger (8).

* * * * *